United States Patent
Kim et al.

(10) Patent No.: US 10,243,697 B2
(45) Date of Patent: Mar. 26, 2019

(54) DATA DECODING METHOD AND DEVICE IN WIRELESS COMMUNICATION SYSTEM

(71) Applicant: Samsung Electronics Co., Ltd., Suwon-si, Gyeonggi-do (KR)

(72) Inventors: Jin-ho Kim, Seoul (KR); Se-bin Im, Suwon-si (KR); Young-seok Jung, Suwon-si (KR); Hui-won Je, Gwacheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/949,203

(22) Filed: Apr. 10, 2018

(65) Prior Publication Data

US 2018/0367247 A1   Dec. 20, 2018

(30) Foreign Application Priority Data

Jun. 19, 2017 (KR) .................. 10-2017-0077583

(51) Int. Cl.
*H04L 27/06* (2006.01)
*H04L 1/00* (2006.01)
*H04L 25/02* (2006.01)

(52) U.S. Cl.
CPC .......... *H04L 1/0054* (2013.01); *H04L 25/024* (2013.01)

(58) Field of Classification Search
CPC . H04L 1/0054; H04L 25/024; H04L 27/2647; H04L 1/20; H03M 13/41; H03M 13/4107; H03M 13/6502; H04N 5/4401; H04B 1/30; H04B 1/28; G11B 20/10009

USPC .......... 375/341, 340, 316, 219, 295
See application file for complete search history.

(56) References Cited

U.S. PATENT DOCUMENTS

| | | |
|---|---|---|
| 6,748,032 B1 | 6/2004 | Kim et al. |
| 7,873,026 B2 | 1/2011 | Cho et al. |
| 8,014,470 B2 | 9/2011 | Lee et al. |
| 8,090,063 B2 | 1/2012 | Lee et al. |
| 8,254,502 B2 | 8/2012 | Sambhwani et al. |
| 8,265,210 B2 | 9/2012 | Kim et al. |
| 8,611,480 B1 | 12/2013 | Lee et al. |
| 8,929,472 B1 | 1/2015 | Lee et al. |
| 8,976,903 B2 | 3/2015 | Subrahmanya et al. |
| 9,240,867 B1 | 1/2016 | Lee et al. |
| 9,319,083 B2 | 4/2016 | Yang et al. |
| 9,401,826 B2 | 7/2016 | Eitel et al. |
| 2008/0019331 A1* | 1/2008 | Thomas ............ H04L 1/0052 370/338 |
| 2016/0072535 A1* | 3/2016 | Yang ............ H04B 1/16 375/341 |
| 2016/0142180 A1 | 5/2016 | Caretti et al. |

* cited by examiner

*Primary Examiner* — Zewdu A Kassa
(74) *Attorney, Agent, or Firm* — Harness, Dickey & Pierce, P.L.C.

(57) ABSTRACT

Provided is a data decoding method of a wireless communication device. The method includes receiving a plurality of sub-frames. The method further includes accumulating data signals respectively included in each of the plurality of sub-frames. The method further includes updating a channel estimation value based on reference signals included in a most recent sub-frame of the plurality of sub-frames. The method further includes calculating a log likelihood ratio (LLR) based on the accumulated data signals and the updated channel estimation value. Furthermore, the method includes decoding data based on the LLR.

20 Claims, 16 Drawing Sheets

DATA DECODING METHOD AND DEVICE IN WIRELESS COMMUNICATION SYSTEM

CROSS-REFERENCE TO RELATED APPLICATION

This application claims priority under 35 U.S.C. § 119 to Korean Patent Application No. 10-2017-0077583 filed on Jun. 19, 2017, in the Korean Intellectual Property Office, the entire contents of which is incorporated herein by reference.

BACKGROUND

Some example embodiments relate to a wireless communication device, and more particularly, to a method and device for decoding data of a repeatedly received signal.

The Internet of things (IoT) refers to a network technology that exchanges information among distributed components, such as various objects, or the like. An object may correspond to an electronic device having various sensors and communication functions, and examples thereof may include a home appliance, a mobile device, a wearable computer, or the like. IoT receivers may be used for, for example, remote meter reading, security, and logistics services may be implemented as low-cost and low-complexity terminals. To improve cell coverage, IoT receivers should be capable of receiving data even in low signal-to-noise ratio (SNR) and fading channel environments. To this end, in a network system including an IoT receiver, repeated transmission and frequency band hopping technologies may be applied. In order to obtain a reliable channel estimation value in a low SNR environment, channel training for several time slots is used. If frequency band hopping occurs, it is difficult to expect a reliable channel estimation value during a time slot immediately after hopping.

SUMMARY

Some example embodiments provide a data decoding method and device capable of improving the performance of a receiver in a communication system to which a low SNR and frequency hopping is applied.

According to some example embodiments, there is provided a data decoding method of a wireless communication device. The method includes receiving a plurality of sub-frames. The method further includes accumulating data signals respectively included in each of the plurality of sub-frames. The method further includes updating a channel estimation value based on reference signals included in a most recent sub-frame of the plurality of sub-frames. The method further includes calculating a log likelihood ratio (LLR) based on the accumulated data signals and the updated channel estimation value. Furthermore, the method includes decoding data based on the LLR.

According to some example embodiments, there is provided a method of operating a receiver. The method includes accumulating N data signals included in N sub-frames sequentially received, N being an integer equal to or greater than 2. The method further includes calculating a channel estimation value based on reference signals included in the N sub-frames. The method further includes calculating a log likelihood ratio (LLR) corresponding to a Nth sub-frame of the N sub-frames based on the N data signals and the channel estimation value. Furthermore, the method includes decoding data based on the LLR.

According to some example embodiments, there is provided a receiver. The receiver includes a memory having computer-readable instructions stored thereon; and one or more processors communicatively coupled to the memory and configured to execute the computer-readable instructions to accumulate N data signals respectively included in N sub-frames sequentially received, N being an integer equal to or greater than 2. The one or more processors are further configured to calculate a channel estimation value based on reference signals included in the N sub-frames. Furthermore, the one or more processors are configured to calculate an LLR based on the N data signals and the channel estimation value.

BRIEF DESCRIPTION OF THE DRAWINGS

Some example embodiments will be more clearly understood from the following detailed description taken in conjunction with the accompanying drawings in which.

DETAILED DESCRIPTION

Figure 1A:
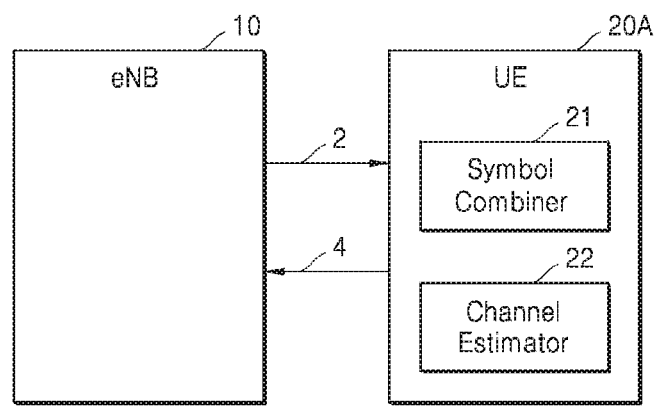
FIG. 1A illustrates a block diagram showing a wireless communication system according to some example embodiments.

FIG. 1A is a block diagram showing a wireless communication system according to some example embodiments.

Referring to FIG. 1A, a wireless communication system 1A may include a base station 10, for example, an evolved Node B (eNB) and a terminal 20A (depicted as user equipment (UE)). The terminal 20A may be located within the cell coverage of the base station 10. The base station 10 and the terminal 20A may communicate with each other via a downlink channel 2 and an uplink channel 4. In the case of communicating via the downlink channel 2, the base station 10 and the terminal 20A may correspond to a radio transmitter and a radio receiver, respectively. In the case of communicating via the uplink channel 4, the base station 10 and the terminal 20A may correspond to a radio receiver and a radio transmitter, respectively.

Figure 1B:
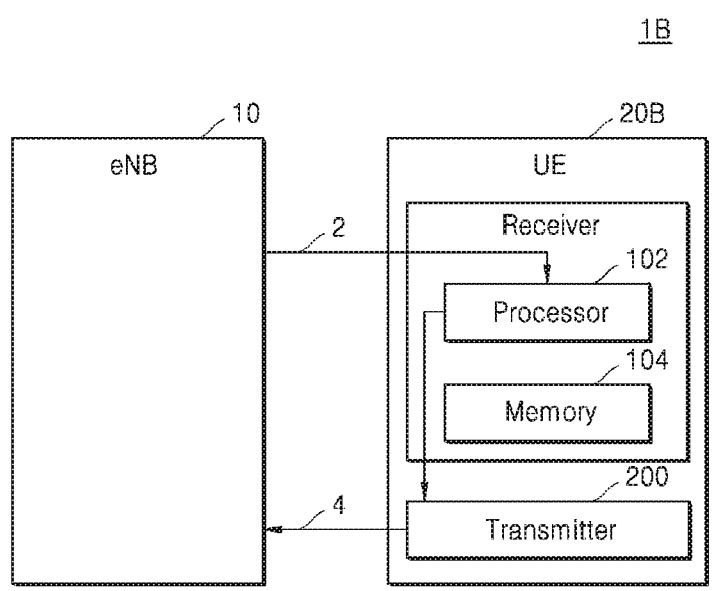
FIG. 1B illustrates a block diagram showing user equipment including a receiver and transmitter deployed within a wireless communication system, according to some example embodiments.

FIG. 1B is a block diagram showing user equipment including a receiver and transmitter deployed within a wireless communication system, according to some example embodiments. The wireless communication system 1B shown in FIG. 1B may be similar to the wireless communication system 1A depicted in FIG. 1A, redundant descriptions will be omitted. Terminal 20B may include a receiver 100 and a transmitter 200. The receiver 100 may include at least one processor 102 and a memory 104. The memory 104 may store software instructions that, when executed by the processor 102 cause the receiver 100 to perform operations as will be discussed further in association with FIG. 4. According to some example embodiments, rather than a processor 102 and memory 104, the receiver 100 may include a hardware block including an analog and/or a digital circuit that causes the processor to perform operations. The processor 102 may receive data from the base station 10 via downlink channel 2 and output data to transmitter 200. The transceiver 200 may transmit data to the base station 10 via uplink channel 4. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multi-processor, an application-specific integrated circuit (ASIC), and a field programmable gate array (FPGA).

The base station 10 may be referred to as a fixed station communicating with the terminal 20A and/or terminal 20B (hereinafter referred to generally as "terminal 20") and/or other base stations and may communicate with the terminal 20 and/or other base stations to transmit and receive data and/or control information to and from the terminal 20 and/or other base stations. For example, the base station 10 may be referred to as a Node B, an eNB, a base transceiver system (BTS), or an access point (AP). The terminal 20 may also be referred to as one of various wireless communication devices capable of communicating with the base station 10 and of transmitting and receiving data and/or control information to and from the base station 10. For example, the terminal 20 may be referred to as user equipment (UE), a mobile station (MS), a mobile terminal (MT), a user terminal (UT), a subscriber station (SS), etc.

A wireless communication network between the base station 10 and the terminal 20 may support communication between multiple users by sharing available network resources. For example, in a wireless communication network, data may be transferred using various protocols, e.g., code division multiple access (CDMA), frequency division multiple access (FDMA), time division multiple access (TDMA), orthogonal frequency division multiple access (OFDMA), single carrier frequency division multiple access (SC-FDMA), sparse code multiple access (SCMA), resource spread multiple access (RSMA), pattern division multiple access (PDMA), etc.

Each component included in the base station 10 and the terminal 20 (e.g., symbol combiner 21 and channel estimator 22) may be a hardware block including an analog circuit and/or a digital circuit or a software block including a plurality of instructions stored in a non-transitory computer-readable media and executable by a processor or the like.

One or both of the wireless communication systems 1A and/or 1B of FIGS. 1A and/or 1B, respectively may be an Internet of Things (IoT) network system, and the terminal 20 may include a low-cost or low-complexity device supporting Machine Type Communication (MTC), Machine to Machine (M2M), sensor network service, or the like that provide services such as remote meter reading, security, or logistics. The terminal 20 may transmit and receive data with the base station 10 using all resource blocks (RBs) or some RBs of a narrowband, which is smaller than a transmission bandwidth of the system, at low cost and low complexity. When the terminal 20 is at a certain location, for example, at a cell boundary, the coverage thereof may be limited.

To improve the cell coverage of the terminal 20, it would be desirable for the terminal 20 to receive data even in a low signal-to-noise ratio (SNR) environment and/or fading channel environment. The base station 10 may repeatedly transmit the same data for a plurality of sub-frames to improve the coverage of the terminal 20. The base station 10 may repeatedly transmit the plurality of sub-frames according to a set number of repetitions. The base station 10 may also transmit the sub-frames within the communication band of the system by frequency band hopping. The base station 10 may transmit a downlink signal including data to the terminal 20 via the downlink channel 2. In some example embodiments, the base station 10 may transmit multi-layers via a plurality of antenna ports.

The terminal 20 may receive sub-frames transmitted from the base station 10 and transmit a response to the received sub-frames and other feedback information via the uplink channel 4. The terminal 20 may decode data included in a sub-frame and then, when decoding succeeds, may not receive further sub-frames transmitted from the base station 10.

When decoding fails, the terminal 20 may re-perform decoding based on the retransmitted data, e.g., the data signal of the subsequently received sub-frame. Here, the terminal 20 may increase the cumulative SNR by using data signals of the previously received sub-frame (hereinafter, referred to as previous data signals). The terminal 20 may combine the previous data signals and data signals of the currently received sub-frame (hereinafter, referred to as current data signals) with a symbol level and may re-perform decoding based on the combined data signals. This may be referred to as a symbol level combining scheme.

The terminal 20 may include a symbol combiner 21 and a channel estimator 22. The symbol combiner 21 may accumulate a plurality of data signals from a plurality of sub-frames including the same data, thereby combining a plurality of data signals at a symbol level.

The channel estimator 22 may estimate a channel value of the downlink channel 2 based on a plurality of reference signals included in a plurality of sub-frames. Each time a sub-frame is received, the channel estimator 22 may perform channel estimation based on the reference signals included in the previously received sub-frames and reference signals included in the received sub-frame. The channel estimator 22 may increase the accuracy of a channel estimation value by filtering the reference signals.

As the number of times the data transmission is repeated, that is, the number of sub-frames received by the terminal 20, increases, the number of reference signals used for channel estimation by the channel estimator 22 increases. Thus, the channel estimator 22 may be trained. The channel estimator 22 may calculate a channel estimation value that is close to the actual channel value as the number of received sub-frames increases. Accordingly, as the number of received sub-frames increases, the reliability of the channel estimation value may be improved.

The terminal 20 may decode data, each time a sub-frame is received or a plurality of sub-frames are received, based on a plurality of data signals combined in the symbol combiner 21 and a channel estimation value calculated in the channel estimator 22, that is, an undated channel estimation value. For example, the terminal 20 may multiply each of the plurality of data signals combined at a symbol level by the updated channel estimation value and then calculate a log likelihood ratio (LLR) based on the result of the multiplication. The terminal 20 may perform decoding based on the calculated LLR.

Assuming that a signal received by the terminal 20 at an i-th sub-frame is defined to be $y_i$, and the same data is repeatedly transmitted N times, a signal vector $Y=[y_0, \ldots, y_{N-1}]^T$ (where, T denotes transpose of matrix) received by the terminal 20 may be expressed by Equation 1.

$$Y = H \cdot x + N_w \quad \text{[Equation 1]}$$

Here, $H=[h_0, \ldots, h_{N-1}]^T$ denotes a complex channel vector, and $h_i$ denotes a channel value of the downlink channel 2 in the i-th sub-frame. $h_i$ may be expressed as a complex number. x is transmission data, and $N_w=[n_0, \ldots, n_{N-1}]^T$ denotes an additive white Gaussian noise (AWGN) vector. The terminal 20 may calculate the LLR used for data decoding, and when a set of modulation symbols of a modulation scheme applied to the transmission data x is defined as X (e.g., $x \in \{X\}$), the LLR for a m-th bit of the transmission data x, $b_m$ may be expressed by Equation 2.

$$LLR(b_m) = \log \frac{\max_{x \in X_m^+} \exp\left(\frac{-\|Y - H \cdot x\|^2}{\sigma^2}\right)}{\max_{x \in X_m^-} \exp\left(\frac{-\|Y - H \cdot x\|^2}{\sigma^2}\right)} \quad \text{[Equation 2]}$$

$$= \sum_{i=0}^{N-1} \log \frac{\max_{x \in X_m^+} \exp\left(\frac{-\|y_i - h_i \cdot x\|^2}{\sigma^2}\right)}{\max_{x \in X_m^-} \exp\left(\frac{-\|y_i - h_i \cdot x\|^2}{\sigma^2}\right)}$$

In Equation 2, exp denotes an exponential function. For the AWGN vector $N_w$, the mean of i-th noise $n_i$ is 0, and the variance thereof is $\sigma^2$, where $n_i$ according to a change of i are statistically independent of each other. In addition, the sets $X_m^+$ and $X_m^-$ may be defined by Equation 3.

$$X_m^+ = \{x \in X | b_m = 0\}, X_m^- = \{x \in X | b_m = 1\} \quad \text{[Equation 3]}$$

In Equation 2, the LLR for $b_m$ may be calculated by the LLR of an i-th symbol. For Binary phase shift keying (BPSK) or quadrature phase shift keying (QPSK) with a gray mapping, an LLR combining scheme such as Equation 2 is mathematically equivalent to a symbol level combining scheme. For example, for QPSK modulation with gray mapping, the LLR may be expressed by Equation 4 and Equation 5 as follows.

$$LLR(b_0) = \log \frac{\max_{x \in X_0^+} \exp\left(\frac{-\|Y - H \cdot x\|^2}{\sigma^2}\right)}{\max_{x \in X_0^-} \exp\left(\frac{-\|Y - H \cdot x\|^2}{\sigma^2}\right)} = \sum_{i=0}^{N-1} \log \frac{\max_{x \in X_0^+} \exp\left(\frac{-\|y_i - h_i \cdot x\|^2}{\sigma^2}\right)}{\max_{x \in X_0^-} \exp\left(\frac{-\|y_i - h_i \cdot x\|^2}{\sigma^2}\right)} \quad \text{[Equation 4]}$$

$$= \sum_{i=0}^{N-1} \frac{2\sqrt{2} \cdot \text{Re}(h_i^* \cdot y_i)}{\sigma^2}$$

$$LLR(b_1) = \log \frac{\max_{x \in X_1^+} \exp\left(\frac{-\|Y - H \cdot x\|^2}{\sigma^2}\right)}{\max_{x \in X_1^-} \exp\left(\frac{-\|Y - H \cdot x\|^2}{\sigma^2}\right)} = \sum_{i=0}^{N-1} \log \frac{\max_{x \in X_1^+} \exp\left(\frac{-\|y_i - h_i \cdot x\|^2}{\sigma^2}\right)}{\max_{x \in X_1^-} \exp\left(\frac{-\|y_i - h_i \cdot x\|^2}{\sigma^2}\right)} \quad \text{[Equation 5]}$$

$$= \sum_{i=0}^{N-1} \frac{2\sqrt{2} \cdot \text{Im}(h_i^* \cdot y_i)}{\sigma^2}$$

Here, Re(CN) denotes real part of a complex number CN, and Im(CN) denotes imaginary part of the complex number. CN* denotes conjugate of CN, for example, $h_i^*$ denotes conjugate of $h_i$.

However, the same characteristics of the LLR combining scheme and the symbol level combining scheme are not limited to the BPSK or QPSK modulation schemes.

As shown by Equation 4 and Equation 5, for a particular modulation scheme, a sufficient statistic for calculating the LLR in the LLR combining scheme may be expressed by Equation 6.

$$\sum_{i=0}^{N-1} h_i^* \cdot y_i \quad \text{[Equation 6]}$$

In an IoT network system, the terminal 20 may have low mobility, and thus, channel coherence time is significantly longer than symbol duration, assuming that the change in channel value over time is small. For example, it may be assumed as expressed by Equation 7.

$$h_0 \approx h_1 \approx \ldots \approx h_N.$$ [Equation 7]

If the terminal 20 estimates a channel estimation value and a channel estimation error for the i-th sub-frame and defines them respectively as $\hat{h}_i$ and $\varepsilon_i = h_i - \hat{h}_i$, the quality of the channel estimation may be improved as the number of sub-frames receiving the same data increases. Therefore, $\varepsilon_i$ may have the same properties as Equation 8.

$$|\varepsilon_0| > |\varepsilon_1| > \ldots > |\varepsilon_{N-1}|.$$ [Equation 8]

In the LLR combining scheme, a sufficient statistic based on a channel estimation value may be expressed by Equation 9.

$$\Sigma_{i=0}^{N-1} \hat{h}^*_i y_i.$$ [Equation 9]

However, in the symbol level combining scheme discussed in the above example, a sufficient statistic based on a channel estimation value may be expressed by Equation 10.

$$(\Sigma_{i=0}^{N-1} y_i) \hat{h}^*_{N-1}$$ [Equation 10]

In other words, a sufficient statistic may be calculated based on the last updated channel estimation value.

An error of a sufficient statistic for the LLR combining scheme, that is, a difference between the sufficient statistic based on an ideal channel value and the sufficient statistic based on the channel estimation value may be expressed by Equation 11.

$$e^{LLR} = \Sigma_{i=0}^{N-1} h^*_i y_i - \Sigma_{i=0}^{N-1} \hat{h}^*_i y_i = \Sigma_{i=0}^{N-1} \varepsilon^*_i y_i.$$ [Equation 11]

Otherwise, an error of a sufficient statistic for the symbol level combining scheme according to some example embodiments may be expressed by Equation 12.

$$e^{symbol} = \Sigma_{i=0}^{N-1} h^*_i y_i - (\Sigma_{i=0}^{N-1} y_i) \hat{h}^*_{N-1} = \Sigma_{i=0}^{N-1} (\varepsilon^*_{N-1} + \delta^*_i) y_i,$$ [Equation 12]

In Equation 12, $\delta_i$ is a change amount of the channel value with respect to time in the i-th sub-frame and may be defined by Equation 13.

$$\delta_i = h_i - h_{N-1}$$ [Equation 13]

In an environment with low mobility, assuming that the change in the channel value is small (e.g., $h_0 \approx h_1 \approx \ldots \approx h_N$), $\delta_i$ may be negligibly small compared to $\varepsilon_i$. Also, considering Equation 8, which is $|\varepsilon_0| > |\varepsilon_1| > \ldots > |\varepsilon_{N-1}|$, the size of the error of the sufficient statistic for the symbol level combining scheme may be smaller than the size of the error of the sufficient statistic for the LLR combining scheme ($|e^{symbol}| < |e^{LLR}|$).

Accordingly, in a communication environment with little change in channel value over time, the terminal 20 may perform decoding according to the symbol level combining scheme that applies an updated channel estimation value to data signals combined at the symbol level, and thus the decoding and reception performances of the terminal 20 may be improved.

In some example embodiments, the terminal 20 may decode data, under certain conditions (as described further below), based on a plurality of data signals combined at the symbol level and an updated channel estimation value, and if the above conditions are not satisfied, data may be differently decoded (e.g., using a different decoding scheme as described further below). For example, when a channel variation with respect to time is equal to or greater than a threshold value, when a redundancy version (RV) of data is changed while the same data is repeatedly transmitted, or when a frequency band of a sub-frame is hopped, the terminal 20 may perform decoding according to other schemes, for example, the aforementioned LLR combining scheme.

As described above, in the wireless communication system 1A according to some example embodiments, the base station 10 may repeatedly transmit the same data, and in response to the transmission, the terminal 20 may perform decoding using parameters calculated by applying a channel estimation value updated through channel training, e.g., a reliable channel estimation value, to data signals combined at the symbol level. Accordingly, the decoding performance of the terminal 20 may be improved. The terminal 20 may improve the reception performance in low SNR and frequency band hopping environments. Furthermore, as the decoding performance is improved, decoding is completed more quickly. Subsequently, additional sub-frame may not be received, whereby the power consumption of the terminal 20 may be reduced and the battery life of the terminal 20 may be prolonged.

Figure 2:
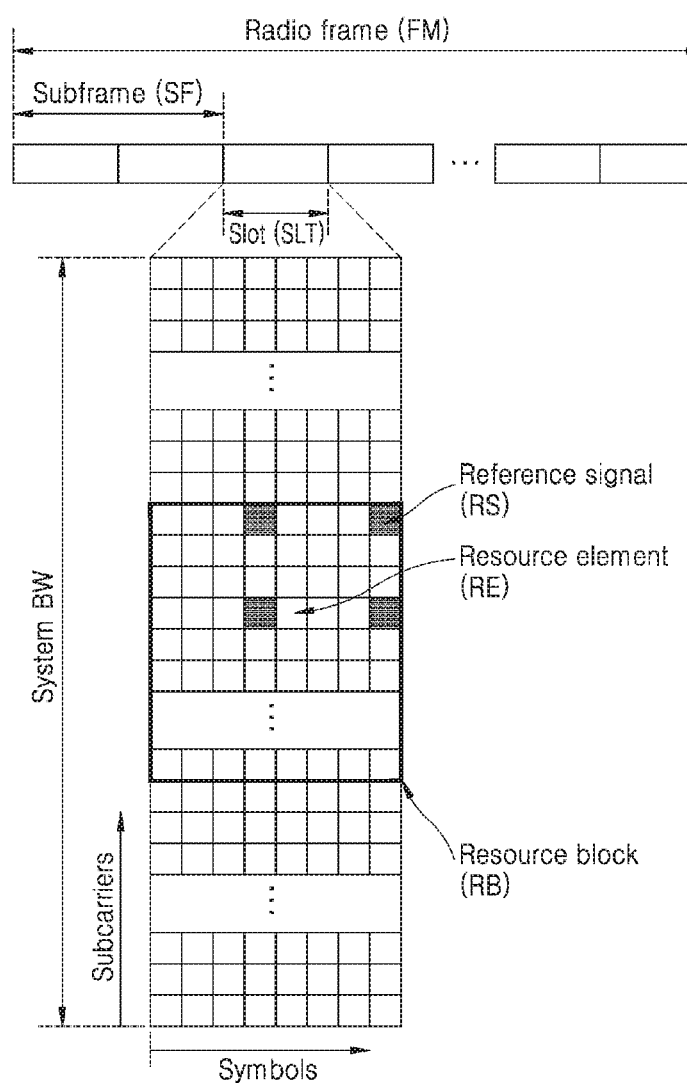
FIG. 2 illustrates an example of a frame structure of a downlink signal.

FIG. 2 illustrates an example of a frame structure of a downlink signal.

The horizontal axis represents the time domain and the vertical axis represents the frequency domain. A downlink signal may include a plurality of frames FM (or radio frames), and one frame FM may include a plurality of sub-frames SF. The terminal 20 (see FIG. 1) may sequentially receive the sub-frames SF.

Each of the plurality of sub-frames SF may include two slots SLT, and each slot SLT may include a plurality of resource blocks RB in the frequency domain. The system transmission bandwidth (BW) may include a plurality of narrow bands, and the plurality of resource blocks RB may be transmitted through each narrow band.

A resource block RB may include a plurality of symbols in the time domain and may include a plurality of subcarriers in the frequency domain. A symbol is a smallest transmission unit in the time domain, and a subcarrier is a smallest transmission unit in the frequency domain. In the time-frequency domain, a basic unit of a resource is a resource element RE and may be represented as a symbol index and a subcarrier index. The smallest transmission unit of data is the resource block RB, and the data rate may be increased in proportion to the number of the resource block RB scheduled to a terminal.

Downlink control information may be transmitted through the first few symbols in the sub-frame SF. The downlink control information may include resource block allocation information, a modulation and coding scheme, a redundancy version, a transport block size (TBS), a HARQ (Hybrid automatic repeat request) process number, a new data indicator which informs whether HARQ is an initial transmission or a retransmission, or the like.

Each resource block RB may include reference signals RS transmitted for channel estimation and/or equalization as well as the resource element RE for transmitting data and control information.

Figure 3:
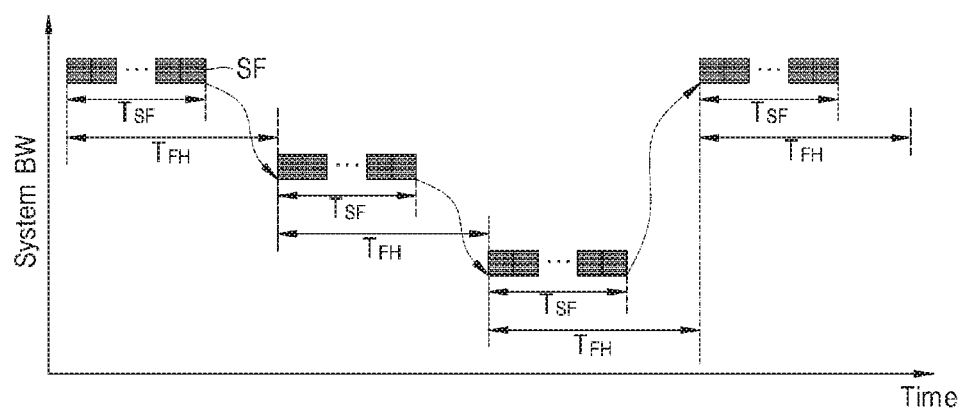
FIG. 3 illustrates an example of repeated transmission of data and frequency bank hopping.

FIG. 3 illustrates an example of repeated transmission of data and frequency bank hopping.

Referring to FIG. 3, the same data may be repeatedly transmitted in a plurality of sub-frames according to a determined number of repetitions, and the frequency band may be hopped. Repeated transmission information (e.g., the number of consecutive sub-frames repeatedly transmitted $T_{SF}$) and frequency band hopping information (e.g., information on the number of narrowbands for hopping, hopping granularity information $T_{FH}$, etc.) may be included in an upper level signal or an L1 signal and then transmitted from the base station 10 (see FIG. 1) to the terminal 20 (see FIG. 1). For example, according to $3^{rd}$ Generation Partnership Project Long Term Evolution (3GPP LTE) IoT communication standards, the maximum number of consecutive sub-frames repeatedly transmitted $T_{SF}$ may be set up to 2048. The hopping granularity information $T_{FH}$ refers to the number of sub-frames transmitted in the same frequency band, and repeated transmission of the same data may be continued after frequency band hopping.

Figure 4:
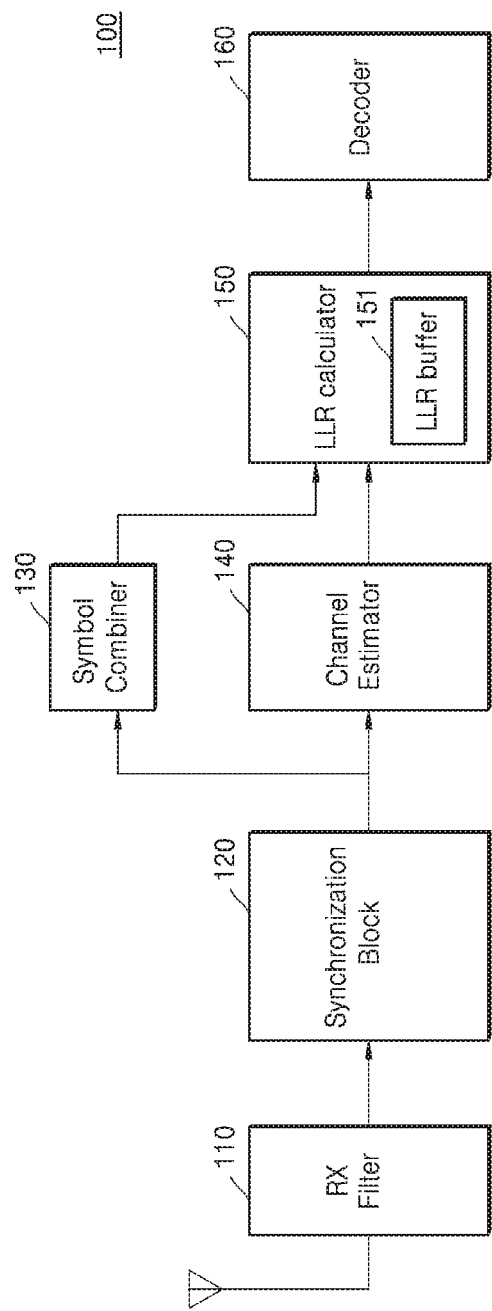
FIG. 4 illustrates a block diagram showing a receiver of a terminal according to some example embodiments.

FIG. 4 is a block diagram showing a receiver of a terminal according to some example embodiments.

The terminal 20 of FIGS. 1A and 1B may include a receiver 100, and the receiver 100 may include a receiver (RX) filter 110, a synchronization block 120, a symbol combiner 130, a channel estimator 140, an LLR calculator 150, and a decoder 160. Each component included in the receiver 100 (e.g., the RX filter 110, the synchronization block 120, the symbol combiner 130, the channel estimator 140, the LLR calculator 150, and the decoder 160) may be a hardware block including an analog circuit and/or a digital circuit or a software block including a plurality of instructions stored in a non-transitory computer-readable media and executable by a processor or the like.

The RX filter 110 may pass only signals of frequencies that a terminal may receive and process from among downlink signals received from a base station through a wireless channel. The RX filter 110 may also convert received signals into digital signals.

When a terminal initially accesses a cell and then performs handover or cell reselection from a currently connected cell to another cell, the synchronization block 120 may perform a cell search by using synchronization signals included in filtered downlink signals (e.g., a primary synchronous signal (PSS) and a secondary synchronous signal (SSS)), and the synchronization block 120 may obtain frequency and symbol synchronizations regarding a cell through the cell search using synchronization signals. The synchronization block 120 may also obtain a downlink frame synchronization regarding a cell and determine a cell identifier (ID).

The symbol combiner 130 may accumulate a data signal (or referred to as a data symbol) included in each of the plurality of sub-frames. The symbol combiner 130 may output accumulated signals. For an example embodiment, the symbol combiner 130 may store the data signal included in each of the plurality of sub-frames and output a set of stored signals as the accumulated signals.

For example, when the symbol combiner 130 receives a first sub-frame, the symbol combiner 130 may store a first data signal included in the first sub-frame and output the stored first data signal. When a second sub-frame including the same data as the first sub-frame is received, the symbol combiner 130 may further store a second data signal included in the second sub-frame and concurrently output both the first data signal and the second data signal. Then, when a third sub-frame including the same data as the second data is received, the symbol combiner 130 may further store a third data signal included in the third sub-frame and concurrently output the first data signal, the second data signal, and the third data signal. As described above, the symbol combiner 130 may sequentially accumulate data signals, thereby combining data signals at the symbol level and outputting the combined data signals.

The channel estimator 140 may perform channel estimation regarding the downlink channel 2 (see FIG. 1). The channel estimator 140 may perform channel estimation based on reference signals included in a sub-frame and at each time a sub-frame is received to update a channel estimation value.

As described above, as the number of times of repeated transmission of the same data increases, that is, the number of the received sub-frames increases, and the number of reference signals that may be used by the channel estimator 140 to perform channel estimation may increase, thereby improving reliability of a channel estimation value.

The LLR calculator 150 may calculate an LLR based on the combined data signals provided from the symbol combiner 130 and the channel estimation value recently provided from the channel estimator 140, that is, the updated channel estimation value.

In some example embodiments, if a certain condition is satisfied (as described further with reference to FIG. 8 and FIG. 9), the LLR calculator 150 calculates an LLR based on the combined data signals provided from the symbol combiner 130 and the updated channel estimation value as described above, and if the condition is not satisfied, the LLR calculator 150 calculates an LLR based on the updated channel estimation value and a data signal included in a sub-frame currently received, rather than the combined data signals provided from the symbol combiner 130.

The symbol combiner 130 may calculate an LLR corresponding to a current sub-frame (hereinafter, referred to as the current LLR) based on the data signal included in the sub-frame currently received and the updated channel estimation value and may calculate an LLR by combining the current LLR with an LLR calculated to correspond to the previous sub-frame (hereinafter, referred to as the previous LLR).

The LLR calculator 150 may include an LLR buffer 151. The previous LLR may be stored in the LLR buffer 151 and may be used for calculating the current LLR. In FIG. 4, although the LLR buffer 151 is illustrated to be included in the LLR calculator 150, some example embodiments are not limited thereto. The LLR buffer 151 may be configured to separate from the LLR calculator 150. For example, the LLR buffer 151 may include an internal memory of the terminal on which the receiver 100 is mounted.

The decoder 160 may perform decoding based on an LLR provided from the LLR calculator 150. The decoder 160 may decode data based on the LLR and determine whether decoding succeeded. The decoder 160 may detect whether an error occurs in the decoded data, e.g., a data packet, by using an error detection code, for example, a cyclic redundancy check (CRC). In some example embodiments, the decoder 160 may correct the error through a forward error correction (FEC). If an unrecoverable error is detected, the decoder 160 may determine that the decoding fails.

When the decoding fails, the receiver 100 may re-perform decoding based on a data signal of a further received sub-frame and the data signal of the previous sub-frame and may repeatedly perform decoding until the decoding succeeds. When the decoding succeeds, the receiver 100 may enter into a power down mode. As described with reference to FIG. 1, the base station 10 (see FIG. 1) may transmit sub-frames including the same data according to a set number of times, and upon successful decoding, the receiver 100 may not further receive the sub-frames transmitted from the base station 10.

The receiver 100 of the terminal according to some example embodiments is described with reference to FIG. 4. However, a configuration of the receiver 100 shown in FIG. 4 is not limited thereto according to some example embodiments. The receiver 100 may include various block configurations according to various communication protocols.

Figure 5:
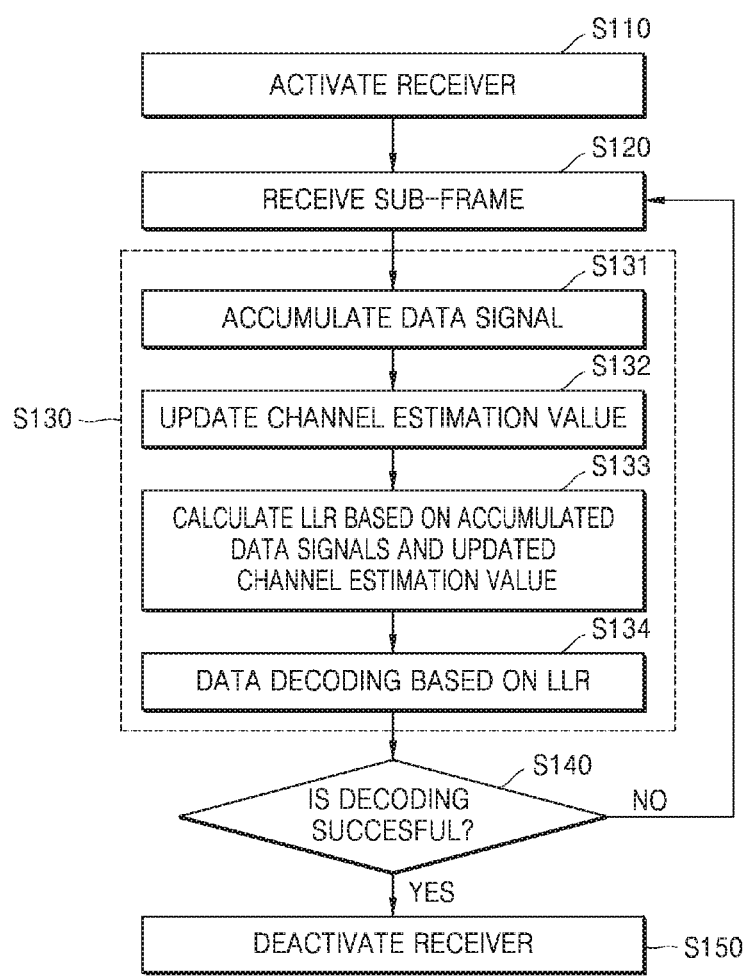
FIG. 5 illustrates a flowchart showing a method of operating a receiver, according to some example embodiments.

FIG. 5 illustrates a flowchart showing a method of operating a receiver, according to some example embodiments. The method of operating a receiver shown in FIG. 5 may be performed by the receiver 100 of FIG. 4. Therefore, descriptions provided with reference to FIG. 4 may be applied to some example embodiments shown in FIG. 5.

Referring to FIG. 5, a receiver is activated (S110) to receive a sub-frame (S120). The receiver may be deactivated in a power down mode and activated to receive a sub-frame at a determined time or in response to a wake-up signal from a base station or user request.

Then, the receiver may accumulate a data signal at a symbol level and decode data based on the accumulated data signal (S130) using sub-operations S131, S132, S133 and S134.

The receiver may accumulate a received data signal (S131). For example, the symbol combiner 130 (see FIG. 4) may accumulate a data signal at each time when a sub-frame is received.

The receiver may update a channel estimation value (S132). For example, the channel estimator 140 (see FIG. 4) may calculate a channel estimation value at each time when a sub-frame is received, and update the channel estimation value based on reference signals accumulated according to the received sub-frames. Operations S131 and S132 may be performed in parallel.

The receiver may calculate an LLR based on the accumulated data signals and the updated channel estimation value (S133). For example, the LLR calculator 150 (see FIG. 4) may calculate an LLR based on the accumulated data signals provided from the symbol combiner 130, e.g., data signals combined at a symbol level and the recently updated channel estimation value provided from the channel estimator 140.

The receiver may decode data based on the LLR (S134). For example, the decoder 160 may decode data based on the LLR and determine whether decoding is successful (S140).

When decoding fails, the receiver may repeat operations S120 to S134 to re-perform decoding. The receiver may repeatedly perform decoding until decoding succeeds.

When decoding succeeds, the receiver may be deactivated (S150). When deactivated, the receiver may enter into a power down mode and may not receive another sub-frame until the receiver is re-activated.

Figure 6:
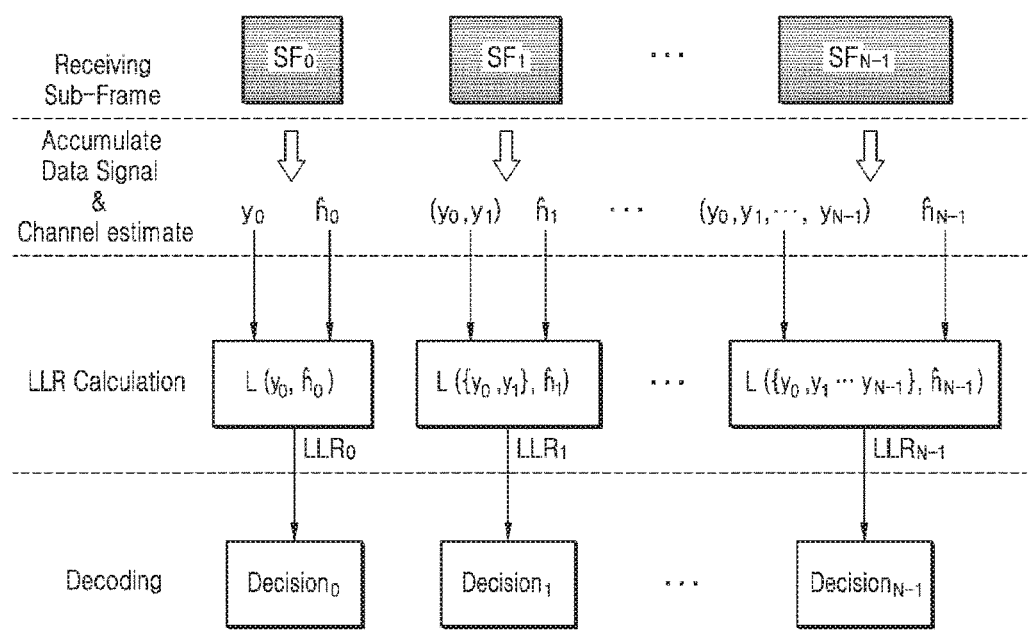
FIG. 6 illustrates a method of decoding data according to a symbol level combining scheme, according to some example embodiments.

FIG. 6 illustrates a method of decoding data according to a symbol level combining scheme according to some example embodiments.

Referring to FIG. 6, when each of first to N-th sub-frames $SF_0$ to $SF_{N-1}$ is received, first to N-th data signals $y_0$ to $y_{N-1}$ respectively provided in the first to N-th sub-frames $SF_0$ to $SF_{N-1}$ may be accumulated. Also, when first to N-th channel estimation values $\hat{h}_0$ to $\hat{h}_{N-1}$ are respectively calculated to correspond to the first to N-th sub-frames $SF_0$ to $SF_{N-1}$, the second to N-th channel estimation values $\hat{h}_1$ to $\hat{h}_{N-1}$ corresponding to the second to N-th sub-frames $SF_1$ to $SF_{N-1}$, which are received after the first sub-frame $SF_0$ is received, may be referred to as updated channel estimation values. Operations for accumulating data signals, calculating a channel estimation value, calculating an LLR and decoding are described with reference to FIG. 5 and thus detailed descriptions thereof will be omitted.

When calculating an LLR, the LLR may be calculated based on data signals accumulated at a symbol level and a channel estimation value. Here, L(a, b) denotes a function for calculating an LLR using 'a' and 'b' as inputs. The function for calculating an LLR may be based on the Equation 4, the Equation 5 and the Equation 10. For example, the first data signal $y_0$ may be provided and the first channel estimation value $\hat{h}_0$ may be calculated based on the first sub-frame $SF_0$, which is first received. A $LLR_0$ may be calculated based on the first data signal $y_0$ and the first channel estimation value $\hat{h}_0$, and when decoding performed based on the $LLR_0$ fails (Decision$_0$), an $LLR_1$ may be calculated based on the first data signal $y_0$ and the second data signal $y_1$ provided from the second sub-frame $SF_1$, which is second received, and the second channel estimation value $\hat{h}_1$. The second channel estimation value $\hat{h}_1$ is the updated channel estimation value of the first channel estimation value $\hat{h}_0$. In this regard, decoding may be performed until the data decoding succeeds (this determination is depicted as Decision$_0$, . . . , Decision$_{N-1}$), an $LLR_{N-1}$ for the N-th sub-frame $SF_{N-1}$, which is N-th received, may be calculated based on the accumulated first to N-th data signals ($y_0$, . . . , $y_{N-1}$) and the N-th channel estimation value $\hat{h}_{N-1}$ updated to correspond to the N-th sub-frame $SF_{N-1}$.

Figure 7:
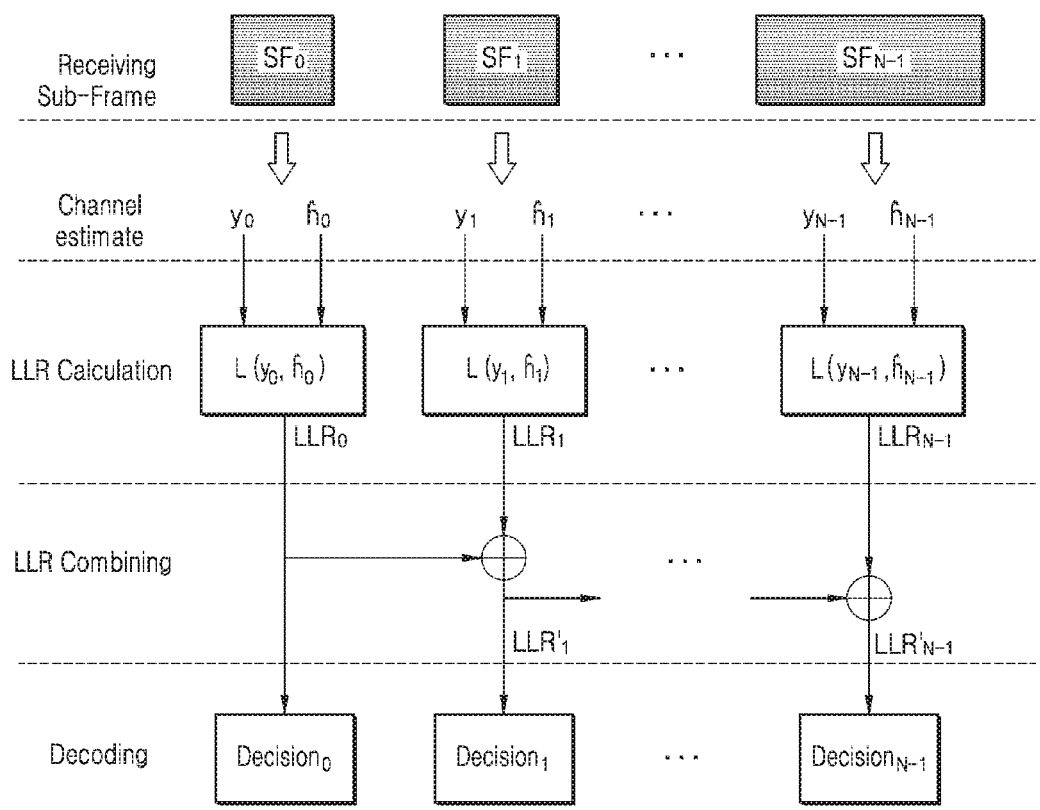
FIG. 7 illustrates a decoding method according to a log likelihood ratio (LLR) combining scheme.

FIG. 7 illustrates a decoding method according to an LLR combining scheme. Some operations of FIG. 7 are described with reference to FIG. 6 and thus detailed descriptions thereof will be omitted.

Referring to FIG. 7, a current LLR corresponding to each sub-frame is calculated based on a data signal and a channel estimation value corresponding to each sub-frame, and decoding may be performed based on a combined LLR, in which a previous LLR is combined with a calculated current LLR. For example, an $LLR_0$ may be calculated based on a first data signal $y_0$ and a first channel estimation value $\hat{h}_0$, and when decoding performed based on an $LLR_0$ fails, the $LLR_0$ may be stored in a buffer, e.g., the LLR buffer 151 (see FIG. 4). A $LLR_1$ may be calculated based on a second data signal $y_i$ and a second channel estimation value $\hat{h}_1$ provided from a second sub-frame $SF_1$, which is second received. The $LLR_1$ may be combined with the $LLR_0$ that is the previous LLR and output from the buffer, and decoding may be performed based on a combined $LLR'_1$. In this regard, according to the LLR combining scheme, data signals may be combined at an LLR calculation level, and thus, the channel estimation values previously estimated may be used.

Figure 8:
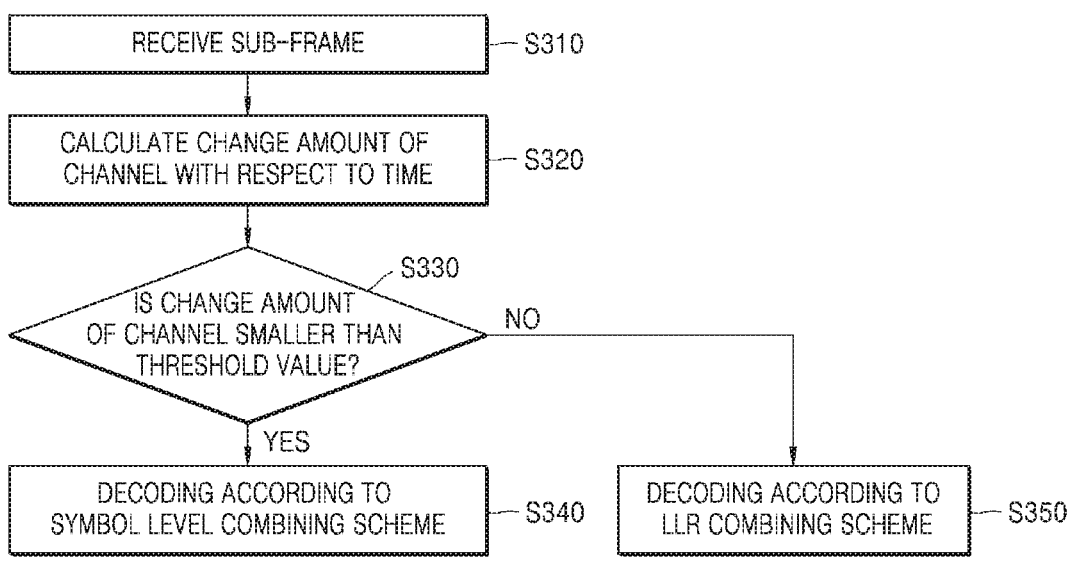
FIG. 8 illustrates a flowchart showing a method of decoding data based on a channel variation, according to some example embodiments.

FIG. 8 illustrates a flowchart showing a method of decoding data based on a channel variation, according to some example embodiments. The method shown in FIG. 8 may be performed by the receiver 100 of FIG. 4.

Referring to FIG. 8, a receiver may receive a sub-frame (S310) and may calculate a channel variation with respect to time (S320). For example, the channel estimator 140 may calculate a channel variation. The channel variation with respect to time may be calculated in various ways. For example, the channel variation with respect to time may be calculated based on a Doppler estimation value, a correlation between channels based on channel values of the reference signals of the sub-frame and a previous sub-frame received before the sub-frame (or based on channel estimation values of the sub-frame and the previous sub-frame, or the like.

The receiver may determine whether the channel variation is less than a threshold value (S330). When the channel variation is less than the threshold value, decoding may be performed according to the aforementioned symbol level combining scheme (S340). Using the symbol level combining scheme, the receiver may accumulate data signals to combine the data signals at a symbol level, apply a recently updated channel estimation value to the combined data signals to calculate an LLR, and then perform decoding based on the calculated LLR.

When the channel variation is greater than the threshold value, the receiver may perform decoding according to the LLR combining scheme (S350). Using the LLR combining scheme, the receiver may calculate a current LLR based on a data signal and an updated channel estimation value, and decode data based on a combined LLR generated by combining a stored previous LLR with the calculated current LLR.

When the channel variation with respect to time is equal to or greater than a threshold value due to the mobility of the receiver, the change amount of the channel value $\delta_i$ may be larger than a channel estimation error $\varepsilon_i$. In this case, the channel value may not be maintained constant, and an error of a sufficient statistic according to the symbol level combining scheme may be greater than an error of a sufficient statistic according to the LLR combining scheme. Therefore, when the channel variation with respect to time is equal to or greater than a threshold value, a decoding performance may be improved by using the decoding method according to the LLR combining scheme. Thus, after detecting the channel variation with respect to time, a decoding method is selectively applied based on the channel variation with respect to time so that a performance of the receiver may be improved in various communication environments.

Figure 9:
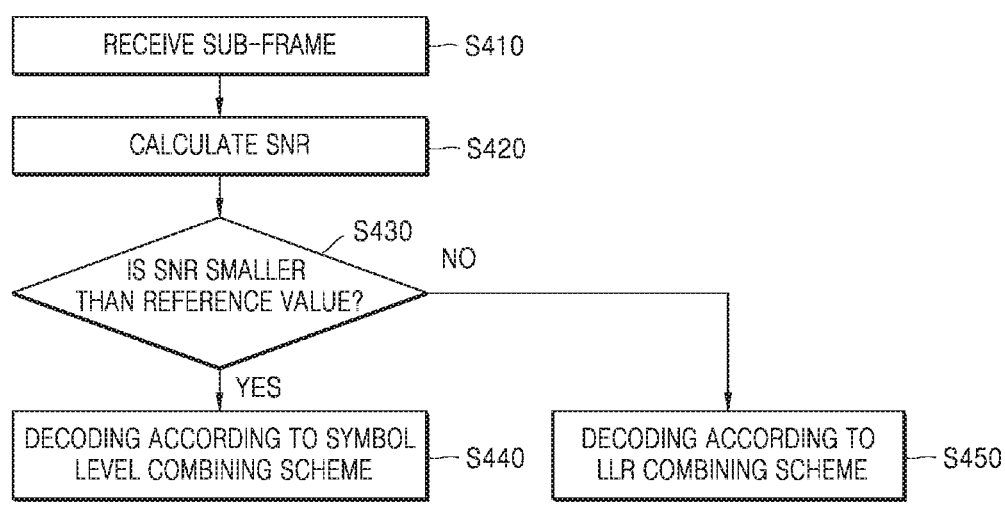
FIG. 9 illustrates a flowchart showing a method of decoding data based on an SNR at a receiver, according to some example embodiments.

FIG. 9 illustrates a flowchart showing a method of decoding data based on an SNR at a receiver, according to some example embodiments. The method shown in FIG. 9 may be performed by the receiver 100 of FIG. 4.

Referring to FIG. 9, a receiver calculates a SNR, and a data decoding method may be selectively applied based on the SNR.

The receiver may receive a sub-frame (S410) and calculate a SNR (S420). For example, the channel estimator 140 (see FIG. 4) may calculate a SNR. However, some example embodiments are not limited thereto and another component of the receiver may calculate a SNR.

The receiver may determine whether the SNR is less than a reference value or whether the SNR is equal to or greater than the reference value (S430). The reference value may be a preset value for the SNR or a value set according to an applied modulation scheme. For example, the reference value may be an SNR value corresponding to a higher-order modulation scheme of 8QAM (Quadrature Amplitude Modulation) or higher.

When the SNR is less than the reference value, the receiver may perform decoding according to the symbol level combining scheme (S440), and when the SNR is equal to or greater than the reference value, the receiver may perform decoding according to the LLR combining scheme (S450). Operations S440 and S450 are the same as operations S340 and S350 of FIG. 8 and thus, repeated descriptions thereof will be omitted.

As described with reference to FIG. 1, the symbol level combining scheme has a high decoding performance at a low SNR when the data signal of the received sub-frame is modulated with a low-order modulation scheme (e.g., BPSK, QPSK, etc.). Therefore, when a SNR is equal to or greater than the reference value and thus, the data signal modulated with a high-order modulation scheme is received, the receiver may perform decoding according to the LLR combining scheme, thereby improving a decoding performance. Accordingly, the receiving performance of the receiver may be adaptively improved in various communication environments.

Figure 10:
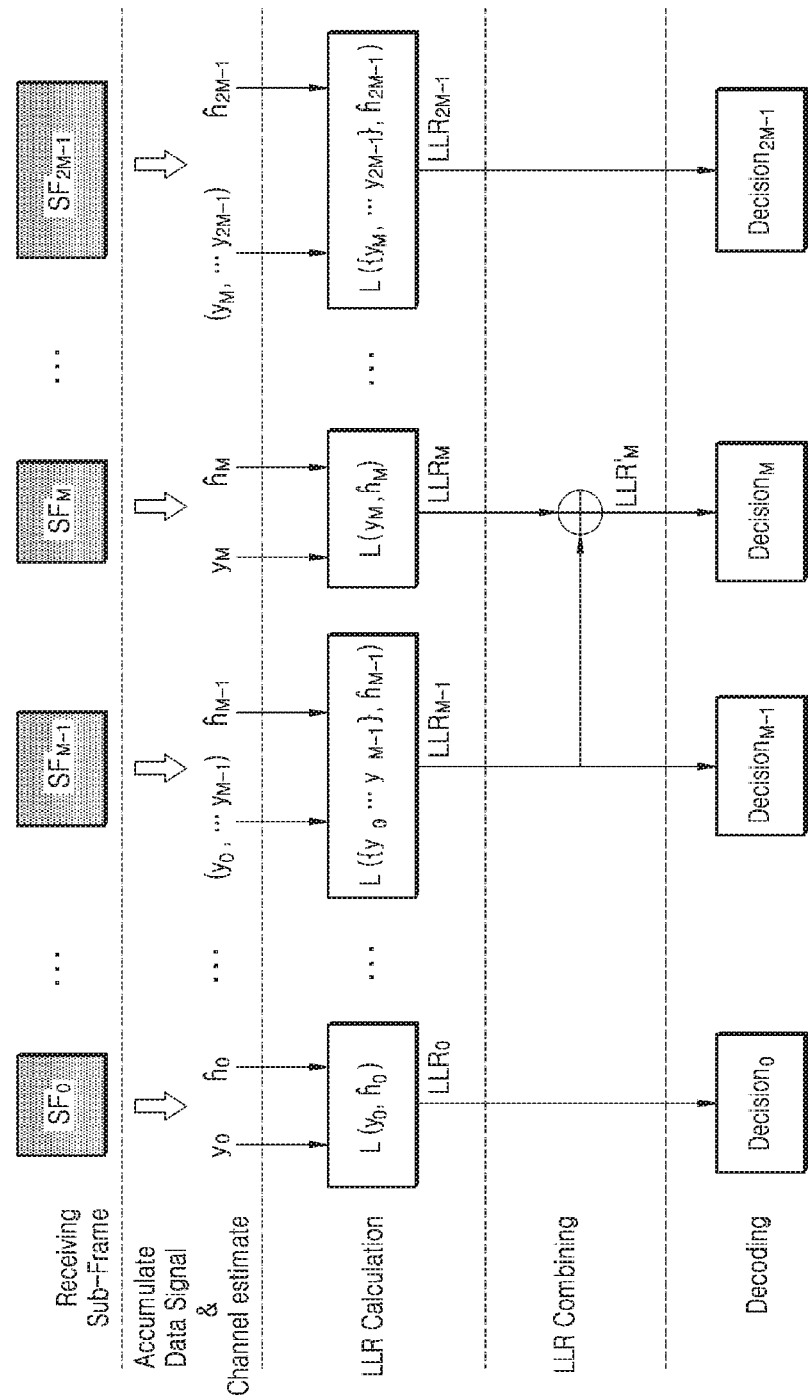
FIG. 10 illustrates a decoding method based on a change in channel characteristic or data received, according to some example embodiments.

FIG. 10 illustrates a decoding method based on a change in channel characteristic or data received, according to some example embodiments. Some operations depicted in FIG. 10 are described with reference to FIGS. 6 and 7 and thus detailed descriptions thereof will be omitted.

FIG. 10 illustrates a decoding method when the channel characteristic is changed or changed data is received while data is repeatedly received. The channel characteristic may include a channel value, a SNR, a channel variation with respect to time, or the like.

Referring to FIG. 10, an M-th sub-frame $SF_{M-1}$ is received, and then, the channel characteristic (e.g., carrier frequency) may be changed or a changed data signal may be received. Decoding may be performed according to the symbol level combining scheme until the M-th sub-frame $SF_{M-1}$ is received, and then, decoding may be performed according to the LLR combining scheme on an M+1-th data signal $y_M$ of an M+1-th sub-frame $SF_M$ received subsequently. A $LLR_M$ may be calculated based on the M+1-th data signal $y_M$ and an M+1-th channel estimation value $\hat{h}_M$, and decoding may be performed based on a combined $LLR'_M$ calculated by combining the $LLR_M$ and the previous $LLR_{M-1}$. In other words, decoding according to the LLR combining scheme may be performed on the M+1-th sub-frame $SF_M$. Decoding according to the symbol level combining scheme may be performed again on sub-frames received after the M+1-th sub-frame $SF_M$.

For example, when a frequency band is hopped, a channel state changes and thus, a channel value before hopping may be different from a channel value after hopping. Therefore, channel training is re-performed to correspond to the same channel state after hopping occurs. In this regard, decoding may be performed according to the LLR combining scheme on the M+1-th data signal $y_M$ included in the sub-frame received immediately after hopping, e.g., the M+1-th sub-frame $SF_M$, and decoding may be performed again according to the symbol level combining scheme on sub-frames subsequently received.

In some example embodiments, while the same data is repeatedly transmitted, a redundancy version of data may be periodically changed. When the redundancy version is changed, the location of the resource element RE (see FIG. 2) in which the same data is transmitted in the resource block RB (see FIG. 2) may be changed. A data signal of a sub-frame received after the redundancy version is changed may not be identical to data signals of sub-frames previously received. Thus, decoding may be performed according to the LLR combining scheme on a data signal received immediately after the redundancy version is changed, and decoding may be performed again according to the symbol level combining scheme for data signals subsequently received.

Figure 11:
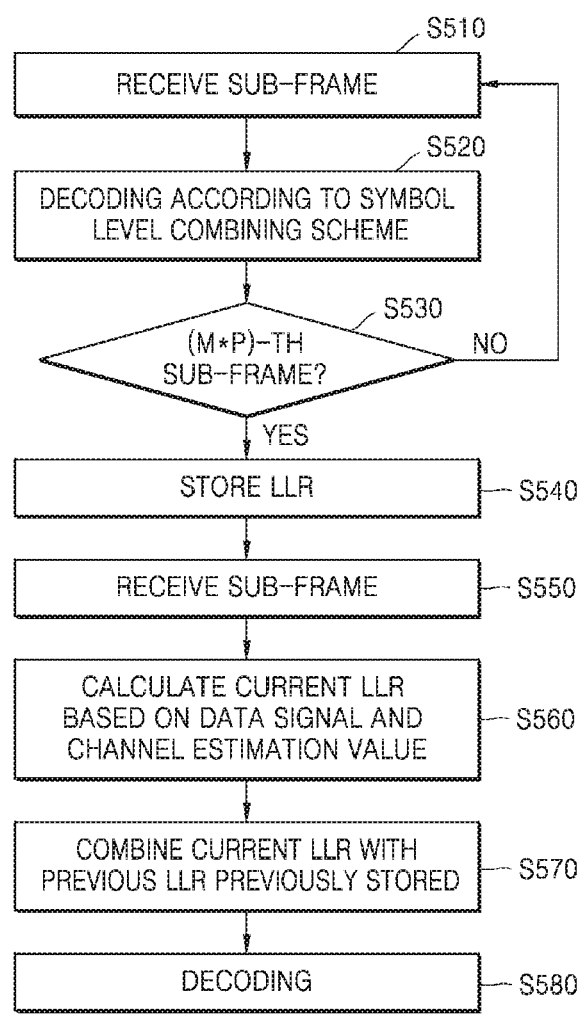
FIG. 11 illustrates a flowchart showing a method of decoding data using either a symbol level or LLR combining scheme based on whether an (M*P)-th sub-frame is received, according to some example embodiments.

FIG. 11 illustrates a flowchart showing a decoding method using either symbol level or LLR combining scheme based on whether an (M*P)-th sub-frame is received, according to some example embodiments.

As described with reference to FIG. 10, FIG. 11 illustrates a decoding method applied when a channel state or data is periodically changed, for example, when frequency band hopping periodically occurs or a redundancy version is changed. It is assumed that the channel state or data is changed in an M-th sub-frame.

Referring to FIG. 11, a receiver receives a sub-frame (S510). Decoding may be performed according to the symbol level combining scheme (S520). Decoding may be performed according to the symbol level combining scheme on a plurality of received sub-frames. When decoding fails, the receiver may determine whether a received sub-frame is an M*P-th sub-frame (S530). Here, M is an integer of 3 or more and may correspond to an already-known channel state at the time the received data changes. P is a positive integer.

When the received sub-frame is not the M*P-th sub-frame, the receiver may repeat operations S510 through S530 to perform decoding according to the symbol level combining scheme on a sub-frame subsequently received.

When the received sub-frame is the M*P-th sub-frame, the receiver may determine that a channel state or data will be changed, such as hopping of a frequency band or a replacement of a redundancy version. The receiver may determine that decoding according to the LLR combining scheme may be performed on a next received sub-frame, and thus, an LLR may be stored as the previous LLR (S540).

The receiver receives another sub-frame (S550), in other words, a new sub-frame is received after a channel state or data is changed and the current LLR may be calculated based on the received data signal and the channel estimation value of the new sub-frame (S560). The receiver may combine the current LLR with the previous LLR stored in operation S540 (S570) and perform decoding based on the combined LLR (S580). As described above, the receiver may determine whether the channel state or data will be changed and perform decoding according to the LLR combining scheme on a data signal of a sub-frame received after the channel state or data is changed. When decoding fails, operation S510 may be re-performed, and decoding according to the symbol level combining scheme may be performed on a data signal of the received sub-frames.

Figure 12:
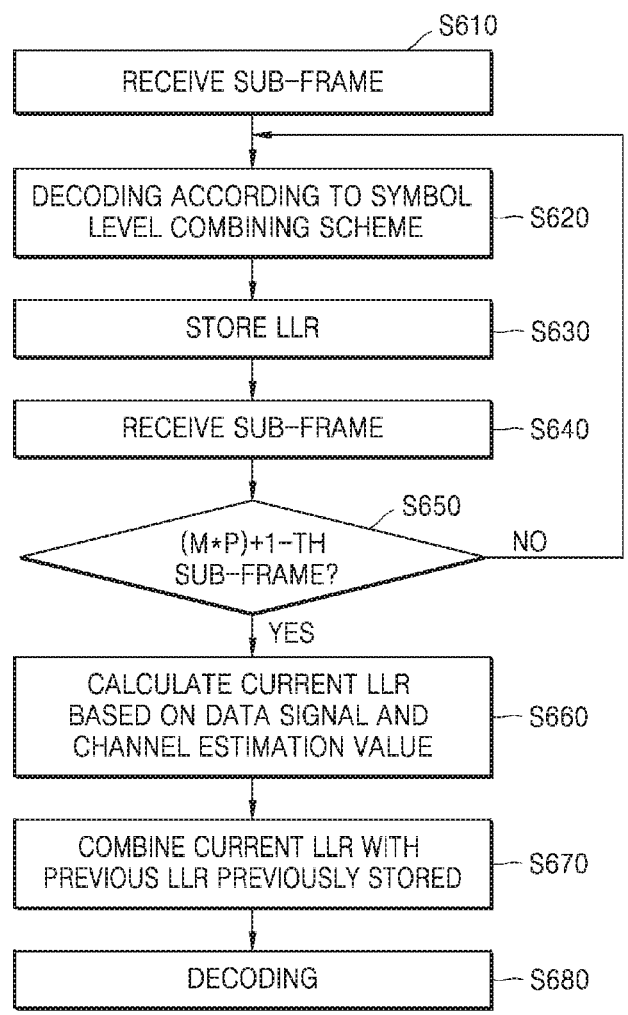
FIG. 12 illustrates a flowchart showing a method of decoding data using either a symbol level or LLR combining scheme based on whether an (M*P)+1-th sub-frame is received, according to some example embodiments.

FIG. 12 illustrates a flowchart showing a decoding method using either symbol level or LLR combining scheme based on whether an (M*P)+1-th sub-frame is received, according to some example embodiments.

It is assumed that a channel state or data is changed in an M-th sub-frame, similar to FIG. 11.

Referring to FIG. 12, a receiver receives a sub-frame (S610) and may perform decoding according to the symbol level combining scheme on a received data signal (S620). Then, the receiver may store an LLR used in operation S620 (S630). The receiver may store the used LLR each time decoding is performed according to the symbol level combining scheme. Accordingly, an LLR buffer (e.g., the LLR buffer 151 of FIG. 4) may be updated each time decoding is performed.

When decoding fails, the receiver may re-receive a sub-frame (S640). The receiver may determine whether the received sub-frame (i.e., the sub-frame received in operation S640) is a (M*P)+1-th sub-frame (S650). The receiver may determine whether the received sub-frame is received after a channel state or data is changed. If the received sub-frame is not the (M*P)+1-th sub-frame, it means that the channel state or data is not changed and thus, the receiver may repeat operations S610 to S650 so that decoding may be performed according to the symbol level combining on sub-frames subsequently received.

If the received sub-frame is the (M*P)+1-th sub-frame, the receiver may calculate a current LLR based on the received data signal and channel estimation value (S660) and combine the current LLR with the previous LLR stored in operation S630 to calculate a combined LLR (S670). The receiver may perform decoding based on the combined LLR (S680). Operations S660, S670 and S680 are respectively similar to operations S560, S570 and S580 of FIG. 11, and thus, the repeated descriptions thereof will be omitted.

Figure 13:
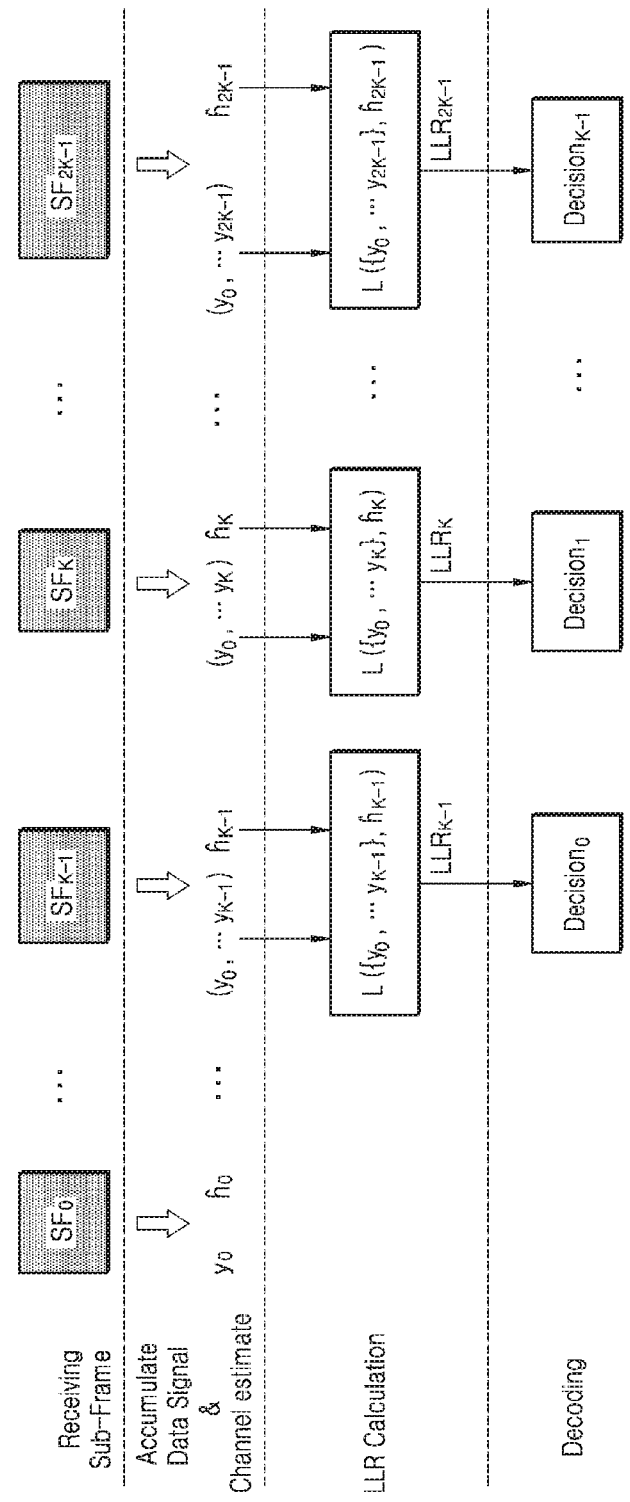
FIG. 13 illustrates a decoding method using either a symbol level or LLR combining scheme based on whether K sub-frames are received, according to some example embodiments.

FIG. 13 illustrates a decoding method using either a symbol level or LLR combining scheme based on whether K sub-frames are received, according to some example embodiments. Some operations depicted in FIG. 13 are described with reference to FIGS. 6 and 7 and thus detailed descriptions thereof will be omitted.

Referring to FIG. 13, when each sub-frame is received, data signals may be combined at the symbol level and a channel estimation value may be updated. However an LLR calculation and decoding may be performed after K sub-frames are received. Here, K is an integer equal to or greater than 2 and may be set based on a channel state such as SNR, a channel variation with respect to time, or the like. As the number of the received sub-frames increases, the reliability of the updated channel estimation value may be improved. A channel estimation value initially calculated may be less reliable. Therefore, the receiver may not perform decoding on K−1 sub-frames initially received and may just accumulate the received data signals and update the channel estimation value. The receiver may then perform decoding after K sub-frames are received.

Figure 14:
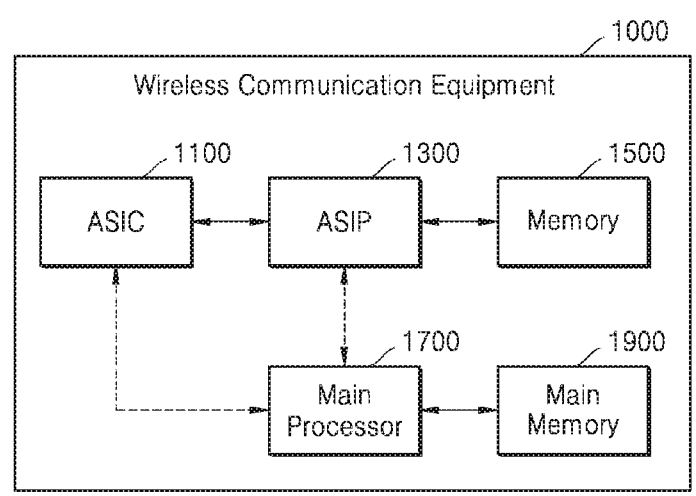
FIG. 14 illustrates a block diagram of a wireless communication device according to some example embodiments.

FIG. 14 is a block diagram showing a wireless communication device according to some example embodiments. As shown in FIG. 14, a wireless communication device 1000 may include an application-specific integrated circuit (ASIC) 1100, an application-specific instruction set processor (ASIP) 1300, a memory 1500, a main processor 1700, and a main memory 1900. Two or more of the ASIC 1100, the ASIP 1300, and the main processor 1700 may communicate with each other. At least two of the ASIC 1100, the ASIP 1300, the memory 1500, the main processor 1700, and the main memory 1900 may be embedded in one chip. According to some example embodiments, any or all of the ASIC 110, ASIP 1300, memory 1500, main processor 1700 and main memory 1900 may be included in a receiver within the wireless communication device 1000.

The ASIC 1100 may be an integrated circuit customized for a particular application and may include a Radio Frequency Integrated Circuit (RFIC), a modulator, a demodulator, or the like, for example. The ASIP 1300 may support a dedicated instruction set for a particular application and may execute instructions included in the instruction set. The memory 1500 may be a non-transitory computer-readable media that communicates with the ASIP 1300 and may store a plurality of instructions executable by the ASIP 1300 as a non-temporary storage device. The memory 1500 may also store data generated during execution of a plurality of instructions in the ASIP 1300. For example, the memory 1500 may be a random access memory (RAM), a read only memory (ROM), a tape, a magnetic disk, an optical disc, a volatile memory, a non-volatile memory, and a combination thereof. Furthermore, the memory 1500 may include any type of memory that may be accessed by the ASIP 1300.

The main processor 1700 may control the wireless communication device 1000 by executing a plurality of instructions. For example, the main processor 1700 may control the ASIC 1100 and the ASIP 1300, process data received through a wireless communication network, or process a user input regarding the wireless communication device 1000. The main memory 1900 may communicate with the main processor 1700 and store a plurality of instructions executed by the main processor 1700 as a non-temporary storage device. For example, the main memory 1900 may include any memory, such as random access memory (RAM), read only memory (ROM), a tape, a magnetic disk, an optical disk, volatile memory, nonvolatile memory, and a combination thereof, that may be accessed by the main processor 1700.

The components of the wireless communication device (e.g., the terminal 20 of FIG. 1 or the receiver 100 of FIG.

4) or an operation for configuring a decoding method according to some example embodiments may be included in at least one of the components included in the wireless communication device 1000 of FIG. 14. For example, at least one of the symbol combiner 130, the channel estimator 140 and the LLR calculator 150 of FIG. 4 may be implemented via a plurality of instructions stored in the memory 1500.

The ASIP 1300 may perform at least one operation from among the operations of the symbol combiner 130, the channel estimator 140, and the LLR calculator 150 by executing a plurality of instructions stored in the memory 1500. In another example, at least one of the symbol combiner 130, the channel estimator 140 and the LLR calculator 150 of FIG. 4 or at least one operation from among operations of data decoding methods may be implemented via a hardware block and included in the ASIC 1100. In another example, at least one of the symbol combiner 130, the channel estimator 140, and the LLR calculator 150 of FIG. 4 or at least one operation from among operations of data decoding methods may be implemented via a plurality of instructions stored in the main memory 1900, and at least one of the symbol combiner 130 and the channel estimator 140, and the LLR calculator 150 or at least one operation from among operations of data decoding methods may be performed as the main processor 1700 executes the plurality of instructions stored in the main memory 1900.

Figure 15:
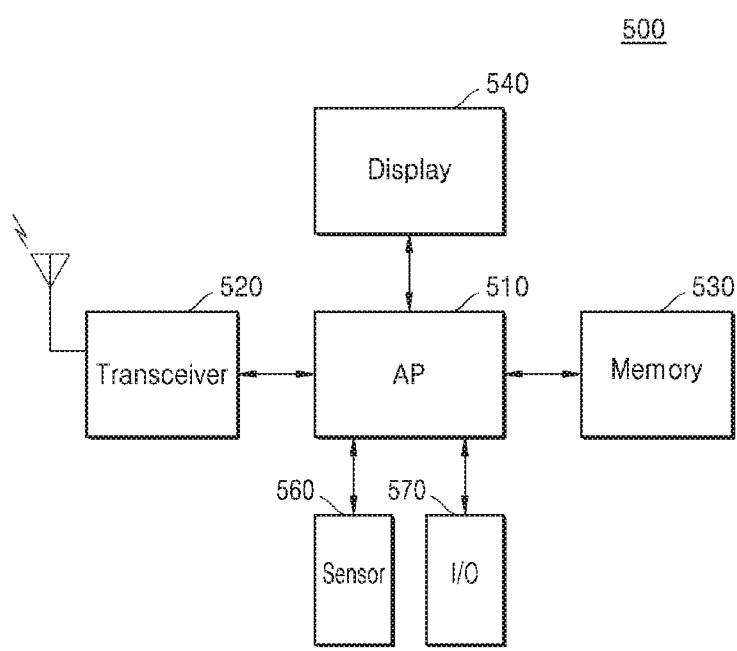
FIG. 15 illustrates a block diagram showing an implementation of an IoT device according to some example embodiments.

FIG. 15 illustrates a block diagram showing an IoT device according to some example embodiments.

Referring to FIG. 15, an IoT device 500 may include an application processor (AP) 510, a transceiver 520, a memory 530, a display 540, a sensor 560, and an input/output device 570.

The IoT device 500 may include the transceiver 520 for communicating with an external device. The transceiver 520 may include, for example, a wireless local area interface such as a local area network (LAN), a Bluetooth, a wireless fidelity (Wi-Fi), or Zigbee, or a modem communication interface connectable to a mobile cellular network such as power line communication (PLC), 3rd Generation (3G), or Long Term Evolution (LTE).

The transceiver 520 may include the receiver 100 (see FIG. 1) according to some example embodiments and may decode data from received signals by the decoding method. Further, according to some example embodiments, any or both of the AP 510 and the memory 530 may be included within the receiver 100 within the transceiver 520. According to some embodiments, the receiver 100 may be communicatively coupled to the AP 510 and the memory 530, and the components of the receiver 100 discussed in association with FIG. 4 (e.g., the RX filter 110, the synchronization block 120, the symbol combiner 130, the channel estimator 140, the LLR calculator 150, and the decoder 160) may be implemented using software instructions stored in the memory 530 and executed by the AP 510.

When the IoT device 500 experiences a low SNR and an environment with low mobility, the transceiver 520 may perform data decoding according to the aforementioned symbol level combining scheme, thereby improving reception performance and reducing power consumption for data reception. In addition, the transceiver 520 may adaptively change the decoding method according to the communication environment of the IoT device 500, thereby improving reception performance.

The AP 510 may control the overall operation of the IoT device 500 and the operation of the configurations of the IoT device 500. The AP 510 may perform various calculations.

According to some example embodiments, the AP 510 may include one processor core (single core) or a plurality of processor cores (multi-Core). According to some example embodiments, the AP 510 may further include a cache memory located internally or externally.

The sensor 560 may be, for example, an image sensor configured to sense an image. The sensor 560 may be connected to the AP 510 to transmit the generated image information to the AP 510. The sensor 560 may be a biosensor configured to sense biometric information. The sensor 560 may be any sensor, such as an illuminance sensor, an acoustic sensor, an acceleration sensor, or the like.

The display 540 may display the internal state information of the IoT device 500. The display 540 may include a touch sensor (not shown). In addition, the display 540 may have an input or output function and a user interface. A user may control the IoT device 500 through the touch sensor and the user interface.

The input/output device 570 may include input means such as a touch pad, a keypad, an input button, or the like, and output means such as a display, a speaker, or the like.

The memory 530 may be a non-transitory computer-readable media that stores a control command code, control data, or user data for controlling the IoT device 500. The memory 530 may include at least one of a volatile memory and a nonvolatile memory. The nonvolatile memory may include read only memory (ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), or ferroelectric RAM (FRAM). The volatile memory may include at least one of various memories such as dynamic RAM (DRAM), static RAM (SRAM), synchronous DRAM (SDRAM), phase-change RAM (PRAM), MRAM, RRAM or FRAM.

The IoT device 500 may further include a power supply unit including internal batteries for internal power supply, or receiving power from an external source. In addition, the IoT device 500 may further include a storage device. The storage device may be a nonvolatile medium such as a hard disk (HDD), a solid state disk (SSD), an embedded multimedia card (eMMC), or a Universal Flash Storage (UFS). The storage device may store a user's information provided through the input/output device 570 and sensed information collected through the sensor 560.

As described above, according to a decoding method and device according to some example embodiments, a reliable channel estimation value is applied to data signals included in a plurality of received data frames, and thus, data decoding performance may be improved. Accordingly, in low SNR and frequency hopping environments, the performance of the receiver may be improved and power consumption may be reduced.

While some example embodiments have been particularly shown and described, it will be understood that various changes in form and details may be made therein without departing from the spirit and scope of the following claims.

What is claimed is:

1. A data decoding method of a wireless communication device, the method comprising:
 receiving a Nth sub-frame;
 combining a Nth data signal included in the Nth sub-frame with at least one data signal included in at least one sub-frame received prior to the Nth sub-frame, the at least one sub-frame and the Nth sub frame being configured to carry a same data;

generating a Nth channel estimation value by updating a N−1th channel estimation value based on a reference signal included in the Nth sub-frame;
calculating a log likelihood ratio (LLR) based on the combined data signals and the Nth channel estimation value; and
decoding the data based on the LLR.

2. The data decoding method of claim 1, wherein the calculating the LLR includes applying the Nth channel estimation value to the combined data signals.

3. The data decoding method of claim 1, wherein the combined data signals includes a N−1th data signal included in a N−1th sub-frame and the Nth data signal of the Nth sub-frame.

4. The data decoding method of claim 1, further comprising:
determining whether a first reception condition is satisfied,
wherein, if the first reception condition is not satisfied, the decoding includes decoding the data based on a combined LLR.

5. The data decoding method of claim 4, further comprising:
calculating the combined LLR,
wherein the calculating of the combined LLR includes,
calculating a current LLR corresponding to the Nth sub-frame based on the Nth data signal included in the Nth sub-frame and the Nth channel estimation value, and
combining the current LLR with a stored previous LLR generated based on a N−1th data signal included in a N−1th sub-frame and the N−1th channel estimation value.

6. The data decoding method of claim 4, further comprising:
calculating a channel variation with respect to time,
wherein, if the channel variation is less than a threshold value, the determining determines the first reception condition is satisfied.

7. The data decoding method of claim 4, further comprising:
calculating a signal-to-noise ratio (SNR),
wherein, if the SNR is less than a reference value, the determining determines the first reception condition is satisfied.

8. The data decoding method of claim 1, further comprising:
receiving a N+1th sub-frame, wherein the N+1th sub-frame is configured to carry the same data as the Nth sub-frame;
generating a N−1th channel estimation value by updating a Nth channel estimation value based on a reference signal included in the N−1th sub-frame;
calculating a combined LLR based on a N−1th data signal included in the N+1th sub-frame, the N+1th channel estimation value and the LLR; and
decoding the data based on the combined LLR.

9. The data decoding method of claim 8, wherein a carrier frequency of the N-th sub-frame is different from a carrier frequency of the N+1-th sub-frame.

10. The data decoding method of claim 8, wherein at least one of
a channel characteristic changes between an N-th sub-frame and the N+1-th sub-frame, or
the Nth data signal and the N+1-th data signal are different.

11. The data decoding method of claim 1, wherein after a same sub-frame is received K times, the calculating the LLR and the decoding are performed.

12. A method of operating a receiver, the method comprising:
receiving N data signals included in N sub-frames sequentially received, N being an integer equal to or greater than 2, wherein the N sub-frames are configured to carry a same data;
calculating a channel variation with respect to time; and
performing additional operations if the channel variation is less than a threshold value, including,
accumulating the N data signals,
calculating a channel estimation value based on reference signals included in the N sub-frames,
calculating a log likelihood ratio (LLR) corresponding to a Nth sub-frame of the N sub-frames based on the accumulated data signals and the channel estimation value, and
performing decoding based on the LLR.

13. The method of claim 12, further comprising:
determining whether the decoding succeeded; and
entering a deactivated state when the decoding succeeded.

14. The method of claim 12,
wherein,
if the channel variation is equal to or greater than a threshold value, the calculating the LLR includes
calculating the LLR based on a previous LLR corresponding to an N−1th sub-frame of the N sub-frames, a data signal included in the Nth sub-frame, and the channel estimation value.

15. The method of claim 12, further comprising:
storing the LLR corresponding to the Nth sub-frame;
receiving an N+1th sub-frame;
calculating an LLR corresponding to the N+1th sub-frame;
combining the LLR corresponding to the Nth sub-frame with the LLR corresponding to the N+1th sub-frame to form a combined LLR; and
performing the decoding based on the combined LLR.

16. A receiver comprising:
a memory having computer-readable instructions stored thereon; and
one or more processors communicatively coupled to the memory and configured to execute the computer-readable instructions to
combine N data signals respectively included in N sub-frames sequentially received, N being an integer equal to or greater than 2, wherein the N sub-frames are configured to carry a same data;
calculate and update a channel estimation value based on reference signals included in a received sub-frame whenever the sub-frame is received; and
calculate an LLR based on the combined N data signals and a Nth channel estimation value.

17. The receiver of claim 16, wherein the one or more processors is further configured to selectively calculate the LLR based on an LLR corresponding to an N−1th sub-frame, a data signal included in an N-th sub-frame, and the Nth channel estimation value based on an LLR combining condition.

18. The receiver of claim 17, wherein the LLR combining condition includes if a channel variation is equal to or greater than a threshold value, or a frequency of the N−1th sub-frame is different from a frequency of the N-th sub-frame, the selective calculation is performed.

19. The receiver of claim 17, further comprising:
a buffer configured to store the LLR.

20. The receiver of claim 16, being comprised in an Internet of things (IoT) device.

* * * * *